United States Patent [19]

Harrison

[11] Patent Number: 5,682,809
[45] Date of Patent: Nov. 4, 1997

[54] APPLIANCE FOR COOKING BAGELS

[75] Inventor: Robert G. Harrison, Seattle, Wash.

[73] Assignee: PMI International Corporation, Seattle, Wash.

[21] Appl. No.: 574,948

[22] Filed: Dec. 19, 1995

[51] Int. Cl.⁶ .................... A47J 27/00; H05B 3/42
[52] U.S. Cl. ................... 99/339; 99/340; 99/410; 219/474; 219/480
[58] Field of Search .................. 99/339, 340, 403, 99/410, 411, 412, 413, 414, 416; 126/273 R, 275 R, 275 E; 219/472, 438, 474, 479, 480

[56] References Cited

U.S. PATENT DOCUMENTS

| 2,156,216 | 4/1939 | Russell et al. | 219/474 |
| 2,664,490 | 12/1953 | Allgeyer | 99/339 X |
| 2,740,880 | 4/1956 | Mead | 219/474 |
| 2,758,589 | 8/1956 | Green et al. | 126/275 R |
| 4,641,015 | 2/1987 | Mayeur | 219/393 X |
| 4,889,972 | 12/1989 | Chang | 99/339 X |
| 5,365,833 | 11/1994 | Chen | 126/273.5 X |

*Primary Examiner*—Reginald Alexander
*Attorney, Agent, or Firm*—Hughes, Multer & Schacht

[57] ABSTRACT

Bagel cooking apparatus which has a casing and a bagel boiling section provided by a water-containing component removably supported from the casing. An oven section in which boiled bagels are baked is located beneath the bagel boiling section. Independently controllable heaters may be provided to boil the water and to bake the bagels or a single heater may be employed for both of those purposes. In the latter case, the removable, water-containing component is constructed so that it can be associated with the casing in two different orientations in which that component respectively directs heat primarily to the bagel boiling section of the apparatus and to its oven section.

15 Claims, 5 Drawing Sheets

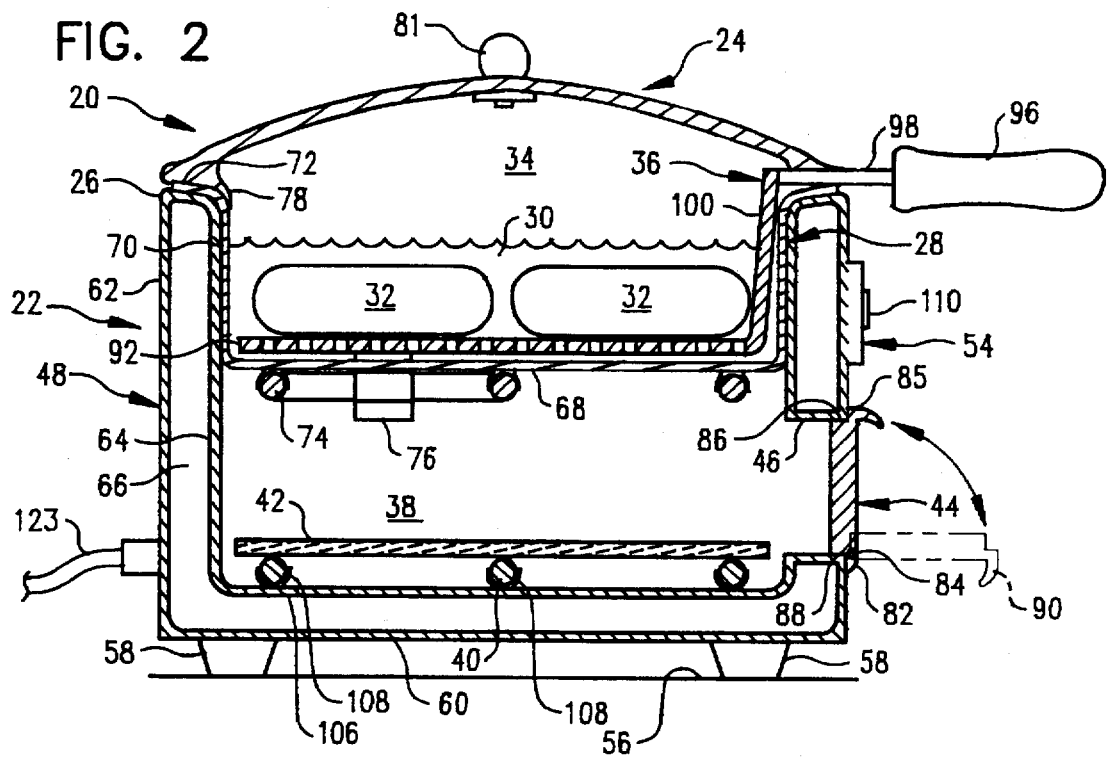
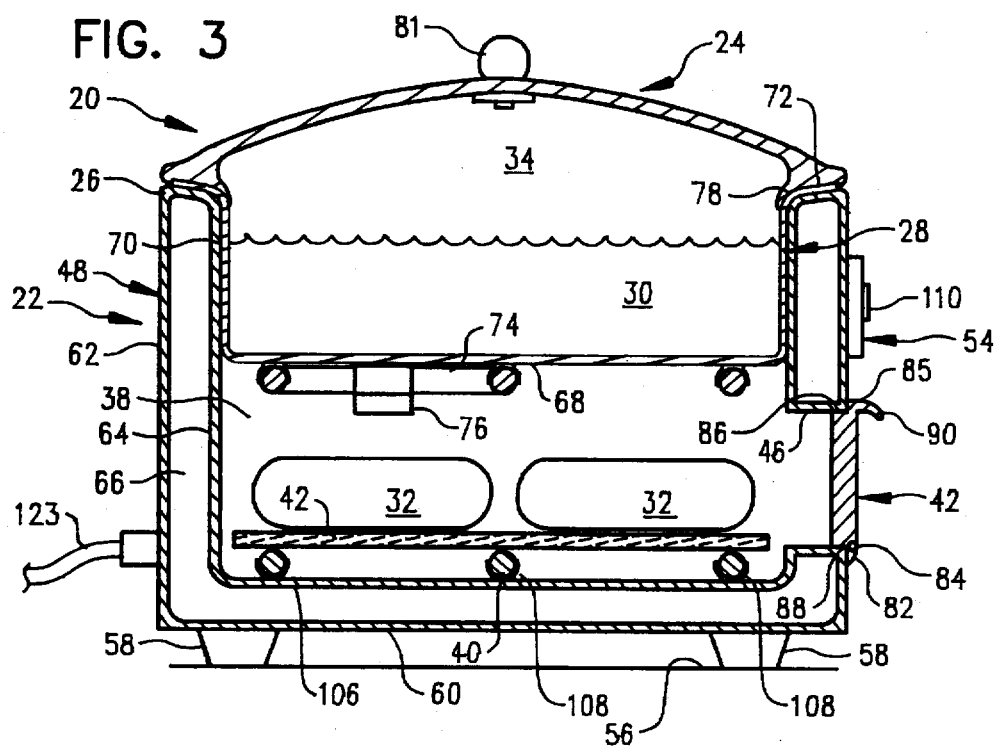

APPLIANCE FOR COOKING BAGELS

TECHNICAL FIELD OF THE INVENTION

The present invention relates to a novel appliance for cooking bagels.

BACKGROUND OF THE INVENTION

Bagels are ring-shaped rolls with a tough, chewy texture. They are prepared by first boiling and there baking a kneaded and proofed bread dough.

Bagels have become a universal food; and automated, commercial scale machines for cooking them in large quantities are in widespread use. However, comparable bagel cooking devices suitable for home use are not available. Instead, the cook has to boil the bagels in a pan of water, remove and drain the boiled bagels, transfer the drained bagels to a baking sheet, and then bake the bagels. In this age of bread and pasta makers and other automated appliances, many may find the above-described, conventional technique for cooking bagels onerous if not totally unsatisfactory. cooking bagels onerous if not totally unsatisfactory.

SUMMARY OF THE INVENTION

There have now been invented and disclosed herein certain new and novel appliances which are scaled for home and other low volume applications and which greatly simplify the task of boiling and then baking the proofed and shaped bagel dough.

Generally speaking, these novel appliances combine an electrically heated boiler with an oven into a single unit. A displaceable rack supports the bagels during the boiling and subsequent baking step of the bagel cooking process. During the boiling step this rack is positioned in a water-containing pan component which is supported from the upper edge of the bagel cooker casing. After the bagels are boiled, they are removed from the water, placed on a shelf in the lower part of the bagel cooker casing, and baked to complete the cooking process.

Separate elements may be employed to heat the water and to bake the boiled bagels. In an alternate arrangement, a single heating element is employed. In one orientation of the pan, heat is directed into the pan to heat the bagel boiling water. With the pan in a second orientation, heat is preferentially directed into the oven zone in the lower reaches of the bagel cooker casing to bake the boiled bagels.

User-operated controls may be employed to select the bagel cooking function (boiling or baking) and the baking temperature and to time the boiling and baking steps. A safety cutout can be provided to prevent overheating in the event that the water in the pan component boils away. In the alternate embodiment of the invention described above, the need for a function-selecting switch is eliminated.

The objects, features, and advantages of the invention will be apparent to the reader from the foregoing and the appended claims and as the ensuing detailed description and discussion proceeds in conjunction with the accompanying drawings.

BRIEF DESCRIPTION OF THE DRAWINGS

FIG. 2 is a section through the FIG. 1 bagel cooker with the bagels in a water-filled pan supported from the upper edge of the bagel cooker casing to boil the bagels;

FIG. 3 is a view similar to FIG. 1 but with the bagels on a shelf in a baking zone at the lower part of the bagel cooker;

DETAILED DESCRIPTION OF THE INVENTION

Figure 1:
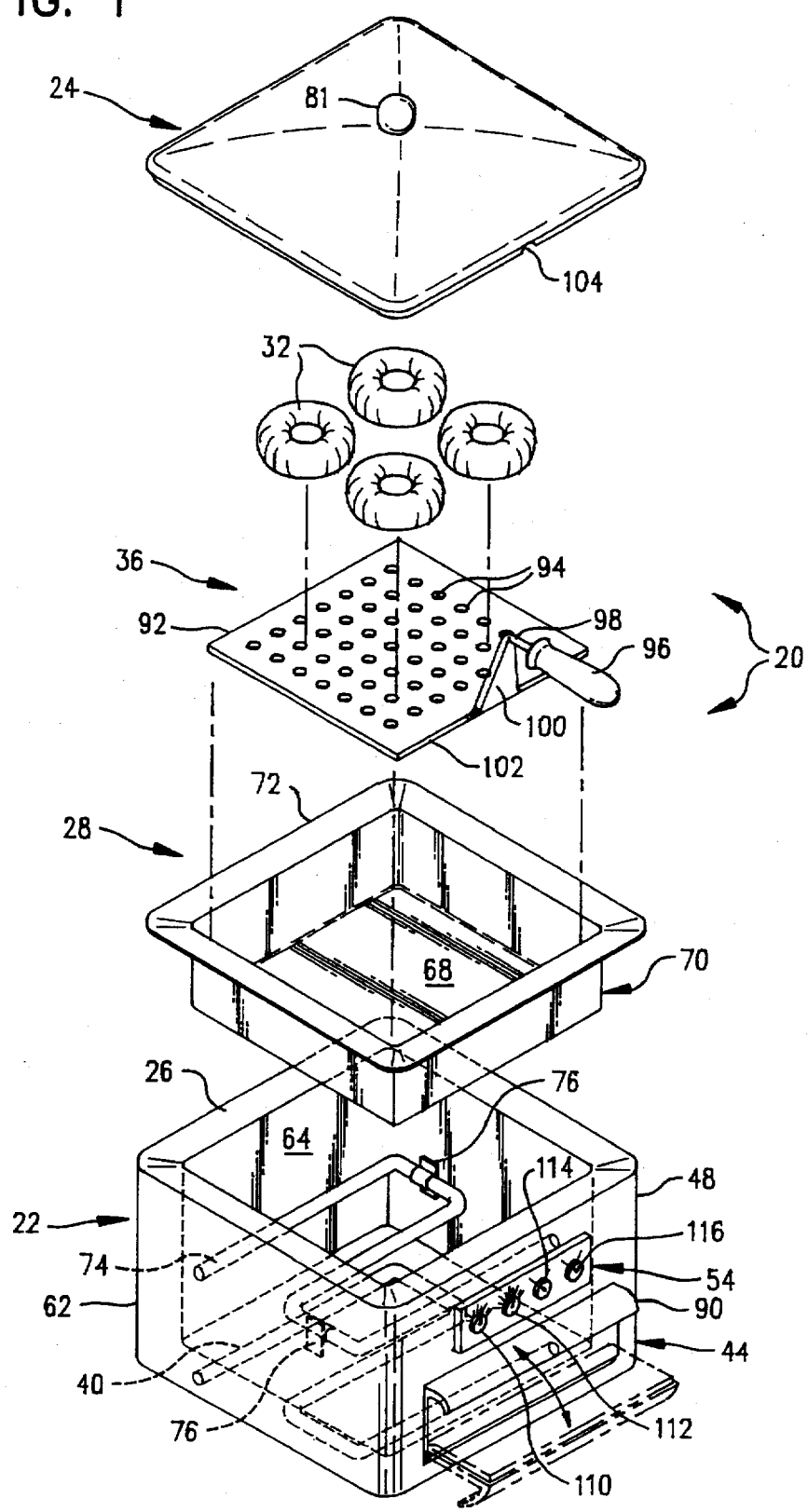
FIG. 1 is an exploded view of a bagel cooker embodying the principles of the present invention.

Referring now to the drawings, FIGS. 1–3 depict a bagel cooker 20 constructed in accord with, and embodying, the principles of the present invention. Bagel cooker 20 includes a casing 22 and a removable cover 24. Housed in casing 22 and supported from the upper rim 26 of that casing is an imperforate inner casing or pan 28 containing a body of water 30 in which uncooked bagels 21 are boiled (see FIG. 2). Pan 28 defines a boiling or boiler section 34.

Bagel cooker 20 also includes a perforate spatula 36 which is used to: (a) introduce uncooked bagels into water 30; (b) support the bagels while they are being boiled in a manner which ensures that the bagels are uniformly cooked; and (c) remove the boiled bagels from the hot water.

Located beneath boiler section 36 is an oven section 38 in which the boiled bagels 32 are baked in a second step of the bagel cooking process carried out in appliance 20 (see FIG. 3). In baking section 38 are a horizontally oriented, sinuous, resistance-type heating element 40 and a removable bagel support or shelf 42 which rests on heating element 40. Access to baking section 38 is gained by opening a door 44. When closed, door 44 spans an opening 46 in the side wall 48 of bagel cooker casing 22.

Figure 9:
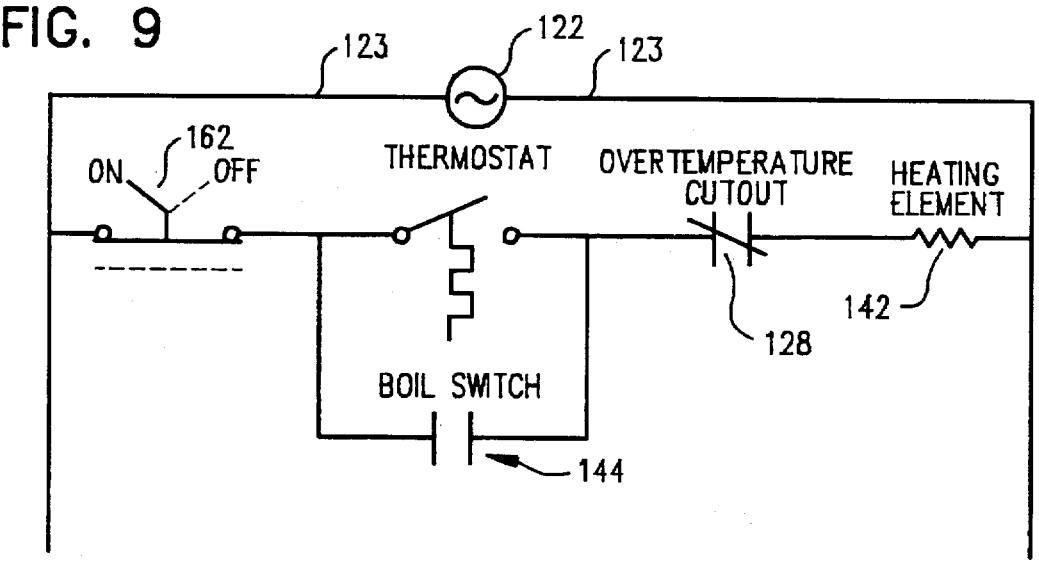
FIG. 9 is an electrical schematic for the FIG. 4 bagel cooker.

In addition to the components just described, bagel cooker 20 includes electrical circuitry identified by reference character 52 in FIG. 9, and an operator-accessible control panel 54 mounted on the side wall 48 of the bagel cooker.

The bagel cooker is supported above the surface 56 on which it is placed by feet 58 attached to the bottom wall 60 of casing 22.

As is shown in FIGS. 2 and 3, the casing 22 of bagel cooker 20 is of double-walled construction. It has integral, outer and inner sections 62 and 64 separated by an insulating, dead-air space 66. To further reduce the possibility that one touching the exterior of casing 22 might be burned, dead-air space 66 may be filled with an appropriate insulation.

It is preferred that casing 22 have a square or other rectangular configuration rather than a circular or other geometric shape. This maximizes the number of bagels that can be cooked at one time in a bagel cooker with a cooking area of a given size.

Water-containing pan 28, best shown in FIG. 1, has a conventional dishlike configuration provided by a bottom wall 68 and side walls collectively identified by reference character 70. The side wall structure 70 terminates in an integral, outwardly extending flange 72 which extends completely around the pan. It is this flange which rests upon the upper margin 26 of casing 22 and supports pan 28 from that casing in the orientation and at the location shown in FIGS. 2 and 3.

The water 30 in pan 28 is heated by a second resistance-type heating element 74 with a sinuous configuration (see FIG. 1). Heating element 74 is supported from casing inner section 64 immediately below the bottom wall 68 of pan 28 and in a horizontal orientation as by the illustrated, U-shaped retainers 76. These retainers may be spot welded or otherwise fixed to the casing wall structure.

Cover 24 keeps steam and hot water vapor from escaping to the exterior of bagel cooker 20. Cover 24 has a domelike configuration. At its edges is an integral, peripheral flange 78 with a configuration complementing that of the flange 72 of pan 28. This complementary pan-and-cover configuration efficiently seals the gap between the cover and pan. The peripheral segment of the pan is similarly configured to match the configuration of the casing wall structure on which it is seated, likewise sealing the gap between the pan and the bagel cooker casing.

A knob 81 is attached to the center of cover 24 to make the cover easier to handle. Knob 81 is fabricated from a material with low thermal conductivity to keep the knob from heating up and burning the user's fingers.

As mentioned above, a door 44 can be opened to access the interior of bagel cooker oven section 38. At its bottom edge 82, door 44 is supported from casing side wall 48 on conventional pivot pins. One of these is shown in FIGS. 2 and 3 and identified by reference character 84.

At its upper edge 85, door 44 has a recess 86 into which casing side wall 48 fits. A similar casing-related recess 88 is provided at the bottom edge 82 of the door. The result is a fit between door 44 and casing structure outer section 62 which efficiently keeps hot gases and vapors from escaping through the access opening 46 in the bagel cooker casing.

To facilitate the opening and closing of door 44, an integral, transversely extending handle 90 is formed at upper door edge 85. Door 44 may be secured in the illustrated, closed position by a magnetic keeper (not shown) or other appropriate retainer.

It was pointed out above and shown in FIG. 2 that bagels 32 are supported in boiling water 30 on spatula 36 during the initial, boiling step of the two-step bagel cooking process. Upon the completion of this step, cover 24 is removed; spatula 36 and the boiled bagels 32 are lifted out of pan 28; door 44 is opened; and the boiled bagels are slid from spatula 36 onto the shelf 42 in the baking section 38 of bagel cooker 20. Spatula 36 is best shown in FIG. 1. That bagel cooker component has a flat blade 92 which matches the configuration of pan 28 although blade 92 is purposely made with somewhat smaller external dimensions so that it can be easily placed in and removed from the pan. Perforations 94 in blade 92 allow boiling water to circulate upwardly through the blade. This results in even cooking of bagels 32.

Spatula 36 also has a handle 96 which is fabricated from wood or a polymer with low thermal conductivity to keep it from getting hot. Handle 96 is mounted on a shaft 98 fixed in any convenient manner to an upstanding, integral bracket 100 at one edge 102 of spatula blade 92.

With spatula 36 supporting bagels 32 during the boiling step as shown in FIG. 2, the handle shaft 98 of spatula 34 rests on the flange 72 of water-containing pan 28. A marginal notch 104 in cover 24 accommodates shaft 98. This allows cover 24 to seat tightly on flange 72 around the entire periphery of pan 28.

Referring now to FIG. 3, with door 44 open as shown in phantom lines in FIG. 1, the blade 92 of spatula 36 can be easily inserted into oven section 38, and the boiled but unbaked bagels 32 can be slid from spatula blade 92 onto bagel support 42.

The support, as shown in FIGS. 2 and 3, is a flat, rectangular member of uniform thickness. It is typically fabricated from a heat-resistant, natural or artificial stone or other material having a low thermal conductivity to maximize its heat retention. This results in the baked bagels having an organoleptically pleasing crust equaling that of a conventionally cooked bagel.

Bagel support 42 is heated by the heating element 40 in the oven section 38 of bagel cooker 22. That heating element is also of the resistance type and of sinuous configuration (see FIG. 1). Heating element 40 is fastened to the bottom 106 of casing inner section 64 as by the illustrated clips 108.

Figure 8:
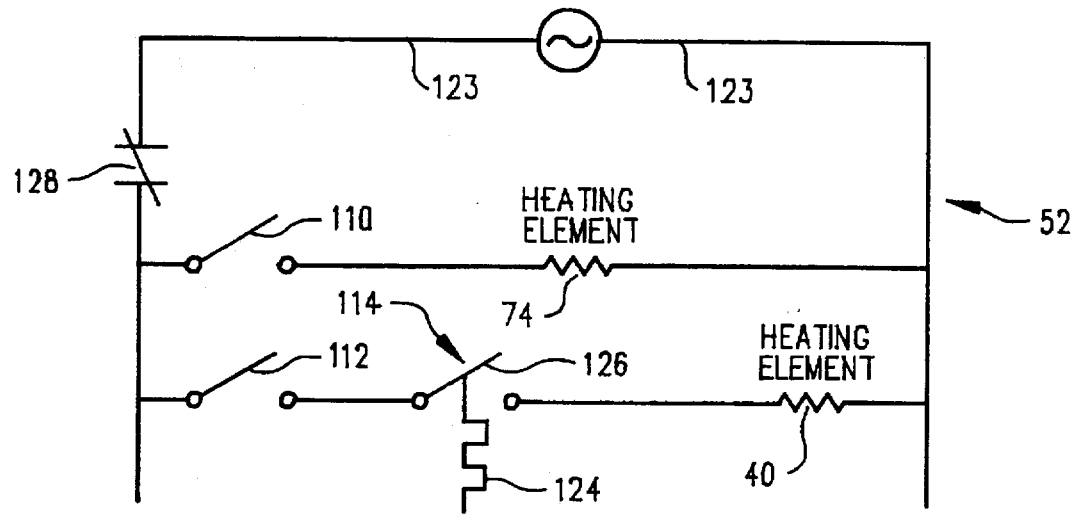
FIG. 8 is an electrical schematic for the FIG. 1 bagel cooker.

Referring now specifically to FIGS. 1 and 8, the operation of the just-described bagel cooker 20 is controlled by a boiler section on-off switch 110, an oven section on-off switch 112, an operator-adjustable temperature control 114, and a conventional mechanical timer 116, all located on control panel 54. As shown in FIG. 8, boiling section heater 74 and boiler section on-off switch 110 are connected in series across an electrical power source 122 by power cord 123. The baking section heating element 40 is connected across the same power source 122 in series with baking section on-off switch 112 and operator-adjustable temperature control 114. The latter is of conventional construction. It includes a bimetallic switch actuator 124 which opens a contact 126 when the operator-selected temperature is reached in oven section 38 of bagel cooker 20. Actuator 124 closes that contact when the temperature in the oven section drops below the selected temperature.

Referring still specifically to FIG. 8, a safety cutout 128 is connected between: (a) boiler and oven section heating elements 74 and 40 and (b) electrical power source 122. The safety cutout prevents overheating if pan 28 runs dry while one of the heating elements 74 or 40 is energized. Safety cutout 128 is of conventional construction. It has a contact which opens to prevent overheating by interrupting the flow of current through the energized heating element 74 or 40.

The two-step bagel cooking process for which bagel cooker 20 is designed is initiated by closing on-off switch 110 to energize heating element 74 and bring the water 30 in pan 28 to a boil. Then, cover 24 is removed; spatula 36 loaded with uncooked bagels 32 is installed in the boiling water; and cover 24 is replaced. At that juncture, timer 116 is set to measure off a boiling period of user-selected duration.

When the time expires, timer 116 generates a typically audible signal. Thereupon, the user lifts off cover 24, removes spatula 36 and the boiled bagels 32 from boiler section 34, and replaces cover 24 to prevent inadvertent contact with the hot water in pan 28. Typically at the same time, the user moves on-off switch 112 to its ON position. This energizes oven section heating element 40, preheating oven section 38 and the support 42 on which the boiled bagels 32 are baked. Next, the user opens oven door 44, inserts spatula blade 92, slides the boiled bagels 32 onto oven section support 42, removes the spatula, and closes door 44. Then, the user sets timer 116 for a baking step of selected length. At the end of this step, the timer signal appears. The user then turns off oven section heating element 40 by moving switch 112 to its OFF position. Oven section door 44 is then opened and the baked bagels removed, typically by sliding them onto spatula 36.

Referring still to the drawings, FIGS. 4–7 depict a second bagel cooker 140 also embodying the principles of the present invention. Bagel cooker 140 has the preferred, square configuration; and many of its components duplicate those of previously described bagel cooker 24. To the extent that this is true, like components have been identified by the same reference characters.

Bagel cooker 140 differs from bagel cooker 24 primarily in that it has only a single, horizontally oriented heating element. This heating element, typically a resistance heater of sinuous configuration, is identified in FIGS. 5–7 by reference character 142. This heater is located at the bottom of boiler zone 36 and is secured in place by U-shaped clips or retainers 76.

Figure 6:
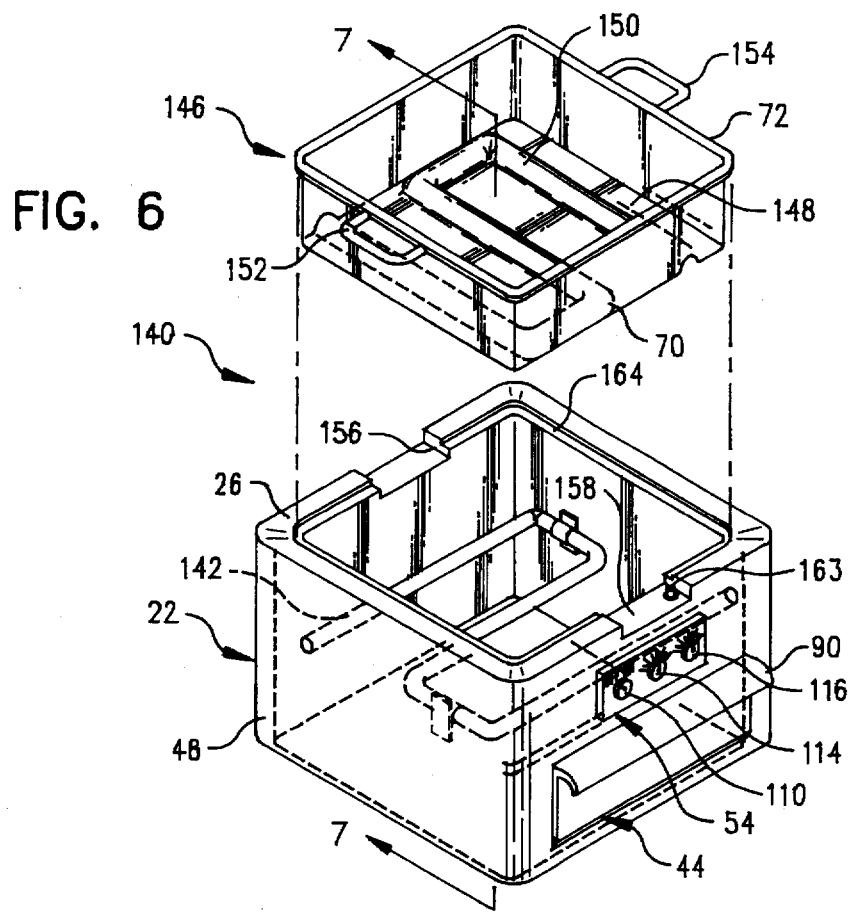
FIG. 6 is an exploded view of the FIG. 4 bagel cooker with a pan component of the bagel cooker reoriented to ready the bagel cooker for the baking step of the bagel cooking process.

Bagel cooker 140 also differs from its FIGS. 1–3 counterpart in that the bagel support 42 in the oven section 38 of the bagel cooker rests directly on the bottom wall 106 of inner casing section 64. Also, bagel cooker 140 differs from its above-described counterpart in that it includes a normally open, spring-loaded, pan-actuated boil switch 144; in that the controls of bagel cooker 140 are different as suggested by the reference to switch 144; and in that the water-containing pan is of a different construction. That pan is best shown in FIGS. 4 and 6 and identified by reference character 146.

Pan 146 has the same dish-shaped configuration as pan 28 as well as a side wall structure 70 and a flange 72 similar to those of pan 28. However, the bottom wall 148 of pan 146 differs in that it has a downwardly opening, sinuous recess 150 which complements the configuration of heating element 142. Also, pan 146 has a pair of U-shaped handles 152 and 154 attached to flange 72 at opposite sides of the pan.

Figure 4:
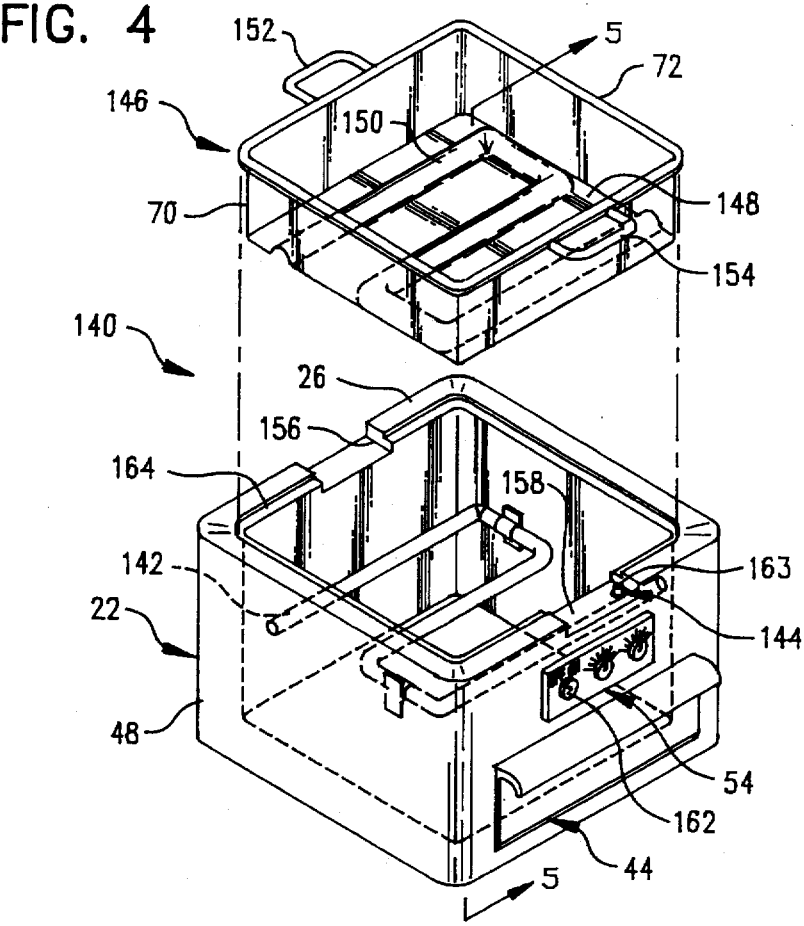
FIG. 4 is an exploded view of a second bagel cooker embodying the principles of the present invention; the bagel cooker is set up for a bagel boiling step.
Figure 5:
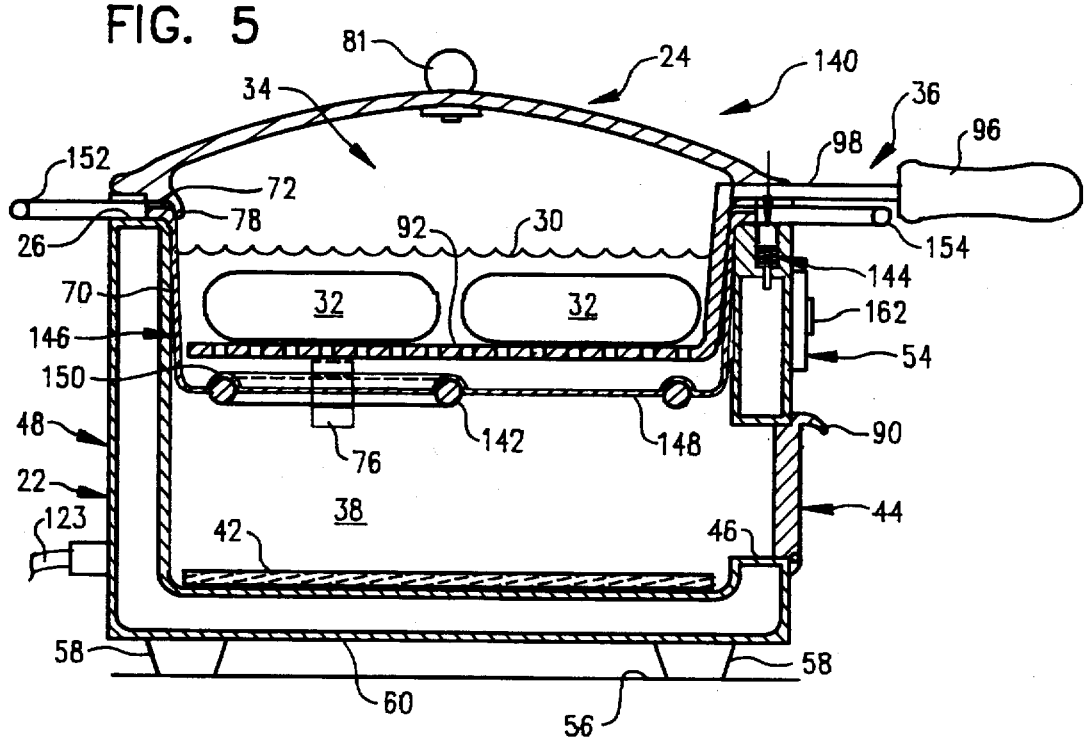
FIG. 5 is a section through the FIG. 4 bagel cooker taken substantially along line 5—5 of FIG. 4; the bagel cooker is also shown as set up for the bagel boiling step in FIG. 5.

Recesses or cutouts 156 and 158 in the upper rim 26 of casing 20 accommodate handles 152 and 154, allowing cover 24 to be tightly seated on pan flange 72 when pan 146 is installed in casing 22 in the FIG. 4 orientation. As in bagel cooker 24, the cover flange/pan flange and pan flange/casing rim seals keep hot gases and vapors from escaping into the ambient surroundings and posing a threat of potential injury.

The above-referred-to control circuit of bagel cooker 140 is illustrated in FIG. 9 and identified by reference character 160. That circuit includes a single off-on switch 162 connected across power source 122 in series with operator-adjustable temperature control 114, overtemperature cutout 128, and heating element 142. Boil switch 144 is connected in parallel with temperature control 114 between on-off switch 162 and overtemperature cutout 128.

In the initial, boiling step of the two-step process carried out in bagel cooker 140, water-containing pan 146 is oriented with respect to bagel cooker casing 22 as shown in FIG. 4. In this orientation, the flange 72 of the pan rests on a ledge 164 located below the rim 26 of casing 22. As a consequence, heating element 142 fits snugly into the sinuous groove or recess 150 in the bottom wall 148 of pan 146, promoting efficient transfer of heat from the heating element to the water 30 in pan 146.

In a manner akin to that discussed above, the user of bagel cooker 140 closes on-off switch 162 to initiate the boiling step. With pan 146 in place, boil switch 144 is closed by handle 154 resting on and depressing the switch actuator 163. Consequently, the closing of on-off switch 162 allows current to flow through heating element 142, heating the water 30 in pan 146 to the boil. Then, as in bagel cooker 20, lid 24 is removed, spatula 36 loaded with bagels 32 and placed in the boiling water, and the lid replaced. As is also the case with bagel cooker 24, the user then sets mechanical timer 116 for the desired boiling step duration. When the time out signal appears, switch 162 is opened; and spatula 36 with its burden of boiled bagels is removed from boiling section 34.

Figure 7:
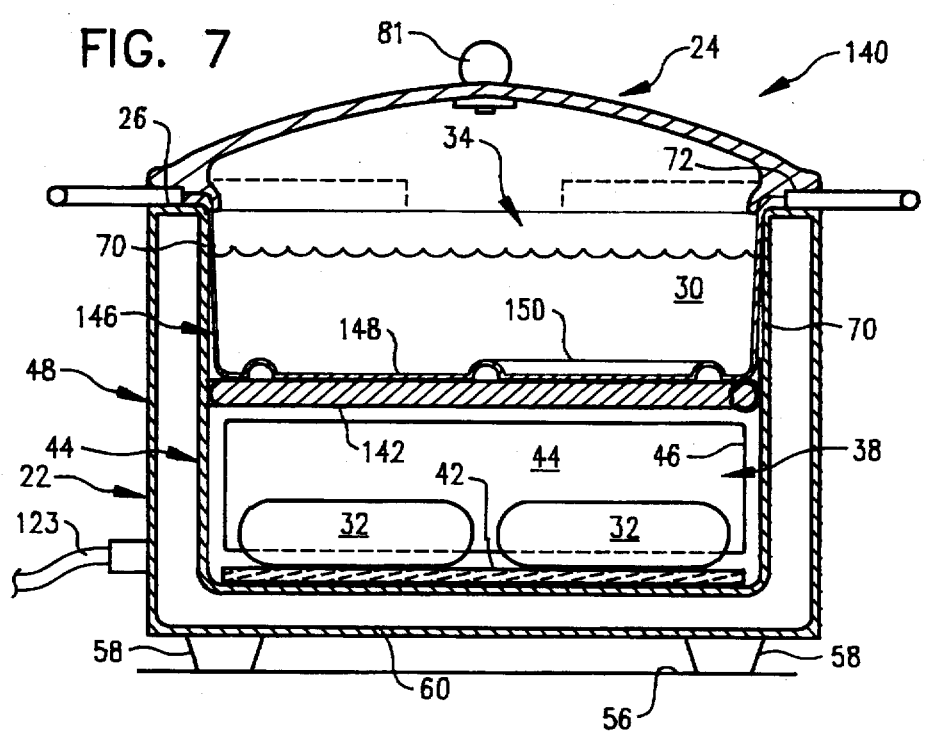
FIG. 7 is a section through the FIG. 4 bagel cooker as set up for baking bagels; the section is taken substantially along line 6—6 of FIG. 6.

Next, the water-containing pan 146 is removed from casing 22 and, without emptying it, rotated horizontally 90 degrees to the orientation shown in FIG. 6. The pan is then lowered into casing 22. Pan handles 152 and 154 rest on the upper rim 26 of casing 22. This supports pan 146 in casing 22 with the bottom wall 148 of the pan slightly above and out of contact with heating element 142 as shown in FIG. 7. This significantly reduces the transfer of heat from element 142 to pan 146. The heat radiated from that element is instead primarily directed into the baking section 38 of bagel cooker 140 to bake the boiled bagels transferred from spatula 36 to the bagel support 42 in oven section 38. Also, in this FIG. 6 orientation of pan 146, the pan does not engage spring-loaded boil switch 144. Consequently, the boil switch remains open.

Prior to transferring the boiled bagels 32 from boiler section 34 to oven section 38, the oven section 38 will typically be preheated as discussed above. This is accomplished by moving on-off switch 162 to the ON position for a second time. With boil switch 144 open, this connects heating element 142 across electrical power source 122 through high temperature cutout 126 and operator-adjustable temperature control 114. After oven section 38 is preheated and the boiled bagels 32 placed on support 42, the user sets mechanical timer 116 for a baking cycle of selected duration with the end of time signal appearing when the time expires. The process is completed by moving on-off switch 162 to the OFF position and removing the now-baked bagels 32 from baking section 38.

The invention may be embodied in many forms without departing from the spirit or essential characteristics of the invention. The present embodiments are therefore to be considered in all respects as illustrative and not restrictive. The scope of the invention is indicated by the appended claims rather than by the foregoing description, and all changes which come within the meaning and range of equivalency of the claims are therefore intended to be embraced therein.

What is claimed is:

1. Bagel cooking apparatus which comprises:

a casing;

a boiler zone in the upper reaches of said casing;

an oven zone in the lower reaches of the casing;

a heater means at the bottom of the boiler zone;

pan means configured to hold water in which bagels can be boiled;

means incorporated in the pan means for supporting said pan means within said casing: (a) in a first orientation relative to the casing in which said pan means is juxtaposed to and promotes the transfer of heat from said heater means to said boiler zone, and (b) in a second, orientation rotated relative to the first orientation in which said pan means is spaced from the heater means and the transfer of heat from said heater means to said oven zone is favored; and circuit means for connecting said heater means across an electrical power source, said circuit means comprising first and second switches, said first switch being manipulatable between open and closed positions by a user of the apparatus and said second switch being: (a) normally open, (b) connected in series with said first switch, and (c) closed by association of the casing supportable pan means with said casing.

2. Bagel cooking apparatus as defined in claim 1 in which the heating means at the bottom of the boiler zone is the only heater means in said apparatus.

3. Bagel cooking apparatus as defined in claim 1 which comprises a perforate support means for bagels being boiled in water contained in said casing supported means.

4. Bagel cooking apparatus as defined in claim 3 in which said perforate support means has a handle which is accessible from the exterior of the casing.

5. Bagel cooking apparatus as defined in claim 1 which has a door in said casing which can be opened to introduce bagels into the oven section of the apparatus.

6. Bagel cooking apparatus as defined in claim 1 which has a bagel support in the oven section thereof, said bagel support being fabricated of a material with low thermal conductivity.

7. Bagel cooking apparatus which comprises:

a casing;

a boiler zone in the upper reaches of said casing;

an oven zone in the lower reaches of the casing;

a heater means at the bottom of the boiler zone;

pan means configured to hold water in which bagels can be boiled;

means incorporated in the pan means for supporting said pan means within said casing: (a) in a first orientation relative to the casing in which said pan means is juxtaposed to and promotes the transfer of heat from said heater means to said boiler zone, and (b) in a second, rotated orientation relative to the casing in which said casing supported pan means is spaced from the heater means and the transfer of heat from said heater means to said oven zone is favored; and circuit means for connecting said heater means across an electrical power source, said circuit means comprising first and second switches, said first switch being manipulatable between open and closed positions by a user of the apparatus and said second switch being: (a) normally open, (b) connected in series with said first switch, and (c) closed by association of the casing supportable pan means with said casing.

8. Apparatus as defined in claim 7 in which said circuit means has a high temperature cutout in series with said first and second switches for interrupting the flow of current to the heater means if the casing supported means boils dry.

9. Bagel cooking apparatus as defined in claim 7 which includes a third, oven-section-temperature-responsive switch means connected in series with said first, user-manipulatable switch and in parallel with said second, normally open switch.

10. Bagel cooking apparatus which comprises:

a casing;

a boiler zone in casing;

an oven zone in said casing beneath said boiler zone;

container means for holding water in which bagels can be boiled, said container means being removable supported by said casing;

a first, removable, perforate support means for bagels immersed in water in said container means;

a handle accessible from the exterior of said casing when said first support means is in said container means;

a shaft connecting said handle to said support means;

a removable cover for said container means, said cover having an aperture through which said shaft can extend when said cover is in place on said container means; and first and second heater means respectively located in said boiler zone and said oven zone.

11. Bagel cooking apparatus as defined in claim 10 in which said second bagel support means is fabricated from a heat retentive material.

12. Bagel cooking apparatus as defined in claim 10 which has a door in said casing which can be opened to introduce bagels into the oven zone of the apparatus.

13. Bagel cooking apparatus which comprises:

a casing;

a boiler zone in the upper reaches of said casing;

an oven zone in the lower reaches of the casing;

a heater means at the bottom of the boiler zone;

a pan means configured to hold water in which bagels can be boiled;

and means for supporting said pan means within said casing: (a) in a first orientation relative to the casing in which said pan means is juxtaposed to and promotes the transfer of heat from said heater means to said boiler zone, and (b) in a second, rotated orientation relative to the casing in which said casing supported pan means is spaced from the heater means and the transfer of heat from said heater means to said oven zone: is favored; and said pan means having a bottom wall means with: (a) complementary recess means in which said heater means is nested when the pan means is in said first orientation relative to said casing and (b) portions which keep the rest of said bottom wall means out of contract with said heater means when the pan means is in said second orientation relative to said casing.

14. Bagel cooking apparatus which comprises:

a casing;

a boiler zone in said casing;

an oven zone in said casing beneath said boiler zone;

container means for holding water in which bagels can be boiled, said container means being removably supported from said casing;

a first, removable, perforate support means for bagels immersed in water in said container means; and a second support means on which bagels can be baked, said second support means being located in the oven section of the apparatus;

first and second heater means respectively located in said boiler zone and said oven zone; and first circuit means for connecting first heater means across an electrical power source and second circuit means in parallel with said first circuit means for connecting said second heater means across said electrical power source, said first circuit means comprising a first user manipulatable on-off switch wired in series with said first heater means and said second circuit means comprising a second, user-manipulatable on-off switch and a third, oven-section-temperature-sensing thermostatic switch, said second and third switches being wired in series with each other and with said second heater means.

15. Bagel cooking apparatus as defined in claim 14 in which comprises a high temperature cut-out in series with said first and second circuit means for interrupting the flow of current to the first and second heater means if said container means boils dry.

* * * * *